July 16, 1968 J. P. DAVIES 3,392,520
TEXTILE APPARATUS
Filed Feb. 9, 1967
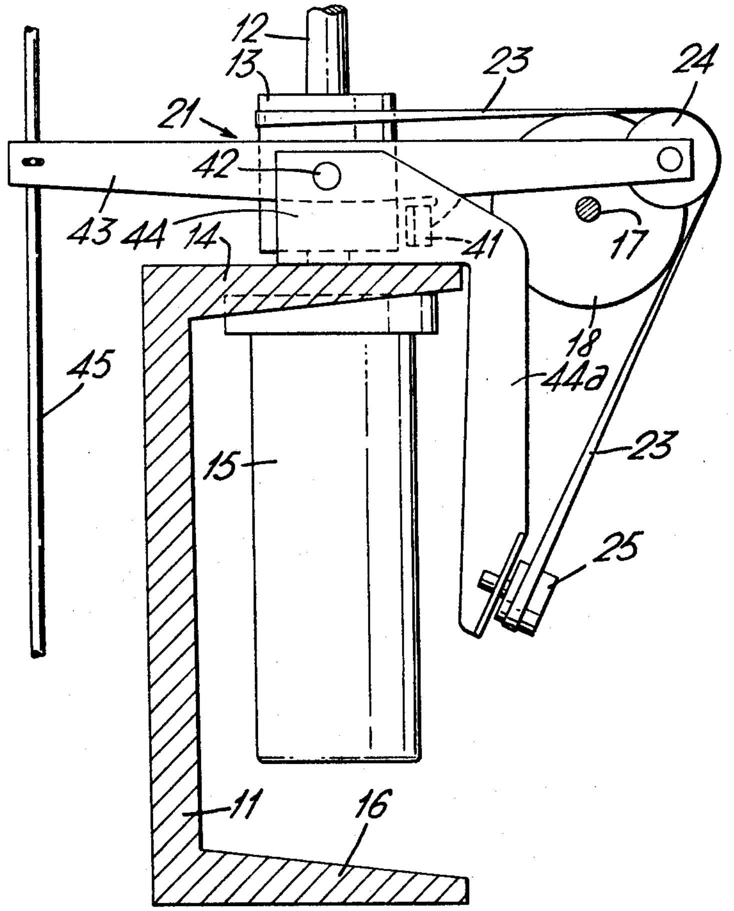
Inventor
John Peter Davies
by Michael J. Striker
Atty

United States Patent Office 3,392,520

Patented July 16, 1968

3,392,520

TEXTILE APPARATUS

John Peter Davies, Marple, England, assignor to Ernest Scragg & Sons Limited

Filed Feb. 9, 1967, Ser. No. 614,958

Claims priority, application Great Britain, Feb. 10, 1966, 5,804/66

11 claims. (Cl. 57—105)

ABSTRACT OF THE DISCLOSURE

In a machine having a rotatable spindle structure, a support element carrying a brake member is mounted for pivotal movement between a first position in which the brake member is spaced from the spindle structure and a tape-engaging element on the support tightens an endless drive tape into frictional engagement with the spindle structure whereby the latter is rotated, and a second position in which the drive tape is slackened and may slip with respect to the spindle structure while the brake member frictionally engages the spindle structure for braking the same.

This invention relates to tape drive mechanisms for spindles of textile machines, the spindles of which are arranged in at least one row lengthwise of the machine, and in which one or a small number of spindles are driven by a tape from a driving pulley on a driving shaft extending along the row of spindles. Such a mechanism will be called a tape drive mechanism of the type described.

In one such known mechanism, there is associated with each spindle a driving pulley, a first idler pulley mounted close to the driving pulley, but on an axis spaced from and parallel to the axis of the driving pulley, and a second idler pulley mounted below the driving pulley on an axis at right angles to the axis of the driving pulley and inclined to the axis of the spindle wharve. The tape passes around the driving and idler pulleys and the spindle wharve in such manner that it can be removed without dismantling any part of the mechanism. A tape drive mechanism of the type described can also have associated with it braking means for the spindle.

The invention comprises support means for at least one tape engaging element of a tape drive mechanism of the type described, adapted to carry a brake member for frictionally engaging the spindle wharve, and capable of pivotal movement between a first position in which said element tensions the tape for driving the spindle and said brake member does not engage the wharve, and a second position, in which the tape is slackened sufficiently to permit slip over one or more of the driving and/or driven surfaces, and said brake member engages the wharve.

The support means may be adapted for attachment to the spindle rail so that it is capable of pivotal movement about an axis close to the spindle wharve.

The support means may comprise a first member adapted for carrying said one tape engaging element and said brake member, pivoted on a second member adapted for attachment to the spindle rail. Said second member may be adapted to carry a second tape engaging element.

The support means may be adapted so that said pivotal movement can be effected by movement, as by a pedal, of an actuating rod rising behind the spindle rail.

Said first member may comprise a beam pivoted between its ends, adapted at one end to carry said one tape engaging element, and at the other end for connection to an actuating rod rising behind the spindle rail and operated as by a pedal. The distance from the point of connection of the first member and the actuating rod to the pivot may be greater than the distance from the brake member to the pivot.

A resilient bush may connect said support means and a shaft or bush on or in which it is pivoted.

The invention also comprises a tape driving mechanism comprising support means as herein described and tape engaging elements. The tape engaging elements may comprise pulleys.

The invention also comprises a spindle rail fitted with a plurality of tape driving mechanisms as herein described.

One embodiment of support means in a tape driving mechanism according to the invention will now be described with reference to the accompanying drawing in which the single figure is an elevation.

The figure illustrates a spindle rail 11 which carries a plurality of spindles, one 12 of which is shown. The spindle 12 has a wharve 13 and is mounted in the upper flange 14 of the spindle rail 11, the bolster 15 being secured to the upper flange 14 and extending therefrom towards the lower flange 16. Extending lengthwise of the spindle rail 11 adjacent the upper flange 14 is a driving shaft 17 carrying driving pulleys of which one, 18, is shown, each located near a spindle to be driven.

The figure illustrates support means 21 for at least one tape engaging element of a tape drive mechanism of the type described, adapted to carry a brake member 41 for frictionally engaging the wharve 13, and capable of pivotal movement between a first position (as shown) in which said element tensions the tape 23 for driving the spindle 12 and said brake member 41 does not engage the wharve 13, and a second position (angularly displaced from the illustrated position about the pivot 42 by a small amount in the clock-wise direction) in which the tape 23 is slackened sufficiently to permit slip over one or more of the driving and/or driven surfaces, and said brake member 41 engages the wharve 13. The pivot 42 is close to the spindle wharve 13, and desirably comprises a rubber or like resilient material bush connecting the support means 21 and a shaft or bush on or in which it is pivoted. This eliminates fretting corrosion which might otherwise occur between the relatively rotatable shaft and bush of the pivot 42.

The support means comprise a first member 43 adapted for carrying said one tape engaging element 24 and said brake member 41, pivoted at 42 on a second member 44 adapted for attachment to the spindle rail 11. Said second member 44 has a depending extension 44*a* adapted to carry a second tape engaging element 25.

The first member 43 comprises a beam, the pivot 42 lying between its ends, adapted at one end to carry said one tape engaging element 24, and at the other end for connection to an actuating rod 45 rising behind the spindle rail 11 and operated as by a pedal (not shown).

The distance from the point of connection of the member 43 and the actuating rod 45 to the pivot 42 is greater than the distance from the brake member 41 to the pivot 42.

The tape engaging elements 24 and 25 are pulleys.

What I claim is:

1. In a machine comprising a support, a spindle structure mounted for rotation on said support, a pulley member, and a driven belt trained around said pulley member and said spindle structure for rotating the latter, a spindle belt engaging mechanism comprising, in combination, an elongated member carried by said support adjacent said spindle structure and having spaced end portions; an idler pulley carried by one of said end portions and adapted to engage said belt; brake means provided on said member proximal to said spindle structure; mounting means mounting said elongated member intermediate said end portions thereof for pivotal movement about a pivot axis between a first position in which said idler pulley tightly engages said belt for biasing the same into tight motion-transmitting contact with said spindle structure to rotate the same while said brake means is spaced from said spindle structure, and a second position in which said idler pulley loosely engages said belt so that the same slackens and slips with reference to said spindle structure and in which said brake means frictionally engages said spindle structure for stopping rotation thereof; and actuating means associated with the other of said end portions and operative for effecting pivotal movement of said member from one to the other of said positions.

2. In a machine as defined in claim 1, further comprising a mounting member mounting said pulley member on said support.

3. In a machine as defined in claim 1, wherein said pivot axis extends transversely of the axis of rotation of said spindle structure and proximal to the latter.

4. In a machine as defined in claim 1; further comprising a mounting member secured to said support, and wherein said mounting means mounts said elongated member on said mounting member for pivotal movement between said first and second positions.

5. In a machine as defined in claim 4, wherein said mounting member comprises a first portion adjacent to said spindle structure and on which said elongated member is mounted, and a second portion projecting from said first portion; and wherein said pulley member is mounted on said second portion.

6. In a machine as defined in claim 5, wherein said second portion projects downwardly of said first portion, said pulley member being located on a level below said idler pulley.

7. In a machine as defined in claim 1, wherein said actuating means comprise foot-operated pedal means operatively associated with said other end portion of said elongated member.

8. In a machine as defined in claim 3, wherein said brake means is provided on said elongated member closely adjacent to said pivot axis.

9. In a machine as defined in claim 8, wherein said actuating means is connected with said other end portion of said member at a predetermined location of the latter, and wherein the distance between said location and said pivot axis is greater than the distance between said pivot axis and said brake means.

10. In a machine as defined in claim 4, wherein said mounting means comprises a shaft carried by said mounting member and about which said elongated member is pivotable, and a resilient bushing connecting said elongated member and said shaft.

11. In a machine as defined in claim 10, wherein said resilient bushing consists of elastomeric material.

References Cited

UNITED STATES PATENTS

| | | | |
|---|---|---|---|
| 2,869,317 | 1/1959 | Schurr et al. | 57—105 |
| 3,069,835 | 12/1962 | Steichele | 57—105 |
| 3,152,434 | 10/1964 | Kemmler | 57—105 |
| 3,166,882 | 1/1965 | Stahlecker | 57—105 XR |
| 3,314,227 | 4/1967 | Pfenningsberg | 57—105 XR |

OTHER REFERENCES

DAS 1,088,398, Germany; Deutscher Spinnereimaschinenbau, publ. Sept. 1, 1960. 57/88.

DAS 1,115,161, Germany; Schurr et al., publ. Oct. 12, 1961. 57/105.

FRANK J. COHEN, *Primary Examiner.*

WERNER H. SCHROEDER, *Assistant Examiner.*